3,429,835
REGENERATION OF WEAK BASE ANION EXCHANGE RESINS

Karsten Odland, La Grange Park, Ill., assignor to Nalco Chemical Company, Chicago, Ill., a corporation of Delaware
No Drawing. Filed Oct. 21, 1965, Ser. No. 500,172
U.S. Cl. 260—2.1  2 Claims
Int. Cl. B01d 15/06

ABSTRACT OF THE DISCLOSURE

A process for regenerating weak base anion exchange resins. In the process a weak base resin which is exhausted by contact with acids is regenerated by contact with an aqueous lime slurry. The acid sorbed on the resin is hydrolyzed off the resin and into the water phase where it is neutralized by the lime. The addition of the acid to the water phase causes additional lime to be dissolved during the neutralization process. The concentration of the lime slurry is in the range of from about 2,000 to 10,000 p.p.m. total alkalinity as $CaCO_3$. The subject process provides a much improved regeneration system for weak base resins.

---

The present invention relates in general to the regeneration of weak base anion exchange resins. More particularly, the subject invention is directed to an economical process for converting an exhausted weak base anion exchange resin to its free base form.

Weakly basic anion exchange resins are used in deionization operations where the removal of only mineral acids is required. The use of these resins is of particular value where the ion exchange system must not impart an objectionable taste, odor or color to the treated water or other liquid. The resins have a low degree of ionization in the free base form and, therefore, they show little or no salt-splitting capacity. Resins of this type are often referred to as adsorbing resins because of their use in removing free mineral acids from solution.

Inasmuch as the weak base anion exchange resins are acid sorbers, they require treatment with an alkali to cause the exhausted resin to revert to its free base form. In the past such regeneration has been carried out with alkaline materials such as NaOH, $Na_2CO_3$, lime water, etc. These resins have also been regenerated by a water wash. The known regeneration methods have not been entirely satisfactory. Regeneration with water, for example, is impractical due to the excessive amounts of water that are required.

It is an object of the present invention to provide an improved process for regenerating spent weak base anion exchange resins.

A further object of the invention is to provide an economical and highly effective method for converting a spent weak base anion exchange resin back to its free base form.

Other objects will become apparent to those skilled in the art from the following detailed description of the invention.

In general, the present invention comprises the discovery that a much improved regeneration process is provided where an aqueous lime slurry is used to regenerate the spent resin. Ordinarily, the maximum solubility of lime in water is approximately 1,800 p.p.m. total alkalinity as $CaCO_3$, obtained after 24 hours of contact with solid $Ca(OH)_2$. It had been believed, therefore, that the use of lime would not serve as a practical regenerant both because of the quantity of water that would be required and also due to the likely precipitation of calcium sulfate.

Unexpectedly, it was found that a slurry containing hydrated lime could be used effectively for weak base anion exchange resin regeneration or neutralization inasmuch as the sorbed acid on the resin is hydrolyzed off the resin and into the water phase where it is neutralized by the lime. The addition of the acid to the water phase causes additional lime to be dissolved during the neutralization process. The neutralization of the hydrolyzed acid causes additional acid to be hydrolyzed off the resin and thus promotes the regeneration of the resin to its free base form. Hydrolyzed lime is really soluble in most mineral acids as opposed to its limited solubility in neutral water.

One of the advantages found in using a lime slurry as a regenerant over a lime water containing no solid lime particles is the added acid neutralization potential which is caused by the higher alkalinity of the slurry. In the lime slurry both dissolved and solid lime can neutralize the acid while in a lime solution only solubilized lime is available for this purpose. Thus, the rate-controlling factor in the case of lime slurry regeneration may be the hydrolysis of acid off the resin, while in the case of lime water (solution) regeneration the rate at which lime is dissolved in water is the rate-controlling factor. In both cases (lime slurry and lime water), dissolved lime may neutralize sorbed acid on the resin before the acid passes into the water phase. Presumably, regeneration by this mechanism can take place in the lime slurry as well as in the lime water. Inasmuch as it is known that spent caustic or lime water regenerants from weakly basic resins have a tendency to be acidic before regeneration has been completed, acid hydrolysis must take place. The lime slurry is capable of neutralizing the acid hydrolyzed off the resin and thus provides a greater potential for regeneration of a weakly basic anion exchange resin than does a solution of lime (one containing no soild lime particles).

As was pointed out above, weakly basic anion exchange resins have a low degree of ionization in the free base form and, therefore, show little or no salt-splitting capacity. Their principal function is to remove mineral acids from solution. The commercially available product Dowex WBR is an example of a weakly basic anion exchange resin of the polyamine type. These polyamine resins ordinarily contain a mixture of primary, secondary, and tertiary amine groups. Dowex WBR can be prepared by the method described in U.S. Patent 2,591,574.

Another commercially available weakly basic anion exchange resin is Dowex WGR. This product is produced from an epi-amine polymer.

The folowing example illustrates the process of the subject invention.

Example

The tests set forth in this example were carried out to determine the feasibility of a lime slurry regeneration of a weakly basic anion exchange resin. In the tests, Dowex WGR was used as the weakly basic resin. In the tests, two 3″ I.D. x 30″ were first exhausted with 1,500 p.p.m. $H_2SO_4$ and HCl respectively and then were regenerated. A lime slurry of 4,000 to 5,000 p.p.m. as $CaCO_3$ of total alkalinity was fed upflow through the columns at a flow rate that produced 25% bed expansion. The effluent was checked for FMA (free mineral acid content) and alkalinity. The columns were exhausted after each regeneration with 1,500 p.p.m. acid. The effluent was collected and checked for total hardness, alkalinity and conductance. During the regeneration, the lime slurry was constantly mixed and pumped from a mixing tank directly into the columns. A total of three regenerations were carried out on the $H_2SO_4$ cycle and a total of five HCl cycles were run to about 80% exhaustion.

The first regeneration of the $H_2SO_4$ cycle was followed by a DI water rinse, whereas all other regenerations were followed with Chicago water rinse or with rinse with softened Chicago tap water.

TABLE 1.—DOWEX WGR UPFLOW REGENERATION WITH LIME SLURRY $H_2SO_4$ CYCLE

| Run No. | Slurry concentration, p.p.m. | Load, kgr./cu. ft. | Regen. excess alk., p.p.m. | Rinse water | Exhaustion capacity, kgr./cu. ft. |
|---|---|---|---|---|---|
| 1 | 4,300 | 13.5 | 150 | DI | 21.8 |
| 2 | 5,000 | 18.5 | 150 | Soft tap | 29.2 |
| 3 | 5,000 | 70.0 | 3,600 | do | 39.2 |

TABLE 2.—SUMMARY OF REGENERATION OF WGR EXHAUSTED WITH 1,500 P.P.M. HCL

| Run No. | Slurry concentration, p.p.m. | Load, kgr./cu. ft. | Regen. excess alk., p.p.m. | Rinse water | Exhaustion capacity, kgr./cu. ft. |
|---|---|---|---|---|---|
| 1 | 4,800 | 41.0 | 1,000 | Chicago tap water | 24-25 |
| 2 | 4,300 | 30.0 | 600 | do | 24-25 |
| 3 | 4,550 | 23.6 | 300 | do | 24-25 |
| 4 | 2,700 | 18.7 | 200 | do | 24-25 |
| 5 | 2,600 | 30.0 | 200 | do | 24-25 |

As is apparent from the above tables the regeneration of the exhausted weakly basic anion exchange resin with a lime slurry produces satisfactory results. Although there was a gradual increase in $Ca^{++}$ leakage as a result of some lime accumulation, this amount did not present serious difficulties.

As was pointed out above, the maximum solubility of lime in water is approximately 1,800 p.p.m. total alkalinity as $CaCO_3$. In the present invention the lime slurry is used containing from 2,000 to as much as 10,000 p.p.m. total alkalinity as $CaCO_3$, and preferably from about 2,500 to 5,000 p.p.m. total alkalinity as $CaCO_3$.

At the present time the best mode contemplated for carrying out the invention involves passing a lime slurry consisting of dissolved lime and lime suspended in aqueous medium in a concentration range of about 2,000 to 10,000 p.p.m., and preferably 2,500 to 4,000 p.p.m., total alkalinity as $CaCO_3$ upwardly through the exhausted weakly basic anion exchange resin. The flow rate can be varied widely. For example, flow rates which expand the bed volume from 10 to 50%, and preferably from 20 to 30%, will be satisfactory for most purposes.

As was pointed out above, the subject process can be used wherever it is desired to convert or neutralize an exhausted weakly basic anion exchange resin. These resins are used to remove or adsorb strong mineral acids from solutions.

Obviously many modifications and variations of the invention as hereinbefore set forth may be made without departing from the spirit and scope thereof, and therefore only such limitations should be imposed as are indicated in the appended claims.

I claim:
1. A process for regenerating a weakly basic anion exchange resin which has been exhausted by contact with solutions containing mineral acids which comprises: passing a lime slurry containing from 2,000 to 10,000 p.p.m. total alkalinity as $CaCO_3$ in an upward direction through an exhausted weakly basic anion exchange resin at a rate such that a hydraulic expansion of the bed is provided which is equivalent to a volume increase of from about 10 to 50%, said resin containing sorbed acid, whereby said exhausted weakly basic anion exchange resin is converted to the free base form.

2. A process as in claim 1 wherein said lime slurry contains from 2,500 to 5,000 p.p.m. total alkalinity as $CaCO_3$.

References Cited

UNITED STATES PATENTS 3,293,175  12/1966  Popper et al. _____ 210—32

OTHER REFERENCES

Duolite Ion Exchange Manual, Redwood City, Calif., Chemical Process Co., 1960 (page 35).

Dowex: Ion Exchange, Midland, Michigan, Dow, 1959 (page 55), 1964 (page 58).

WILLIAM H. SHORT, *Primary Examiner.*

M. GOLDSTEIN, *Assistant Examiner.*

U.S. Cl. X.R.

210—32

UNITED STATES PATENT OFFICE
CERTIFICATE OF CORRECTION

Patent No. 3,429,835

February 25, 1969

Karsten Odland

It is certified that error appears in the above identified patent and that said Letters Patent are hereby corrected as shown below:

Column 3, line 24, "CA$^{++}$" should read -- Ca$^{++}$ --.

Signed and sealed this 21st day of April 1970.

(SEAL)
Attest:

Edward M. Fletcher, Jr.
Attesting Officer

WILLIAM E. SCHUYLER, JR.
Commissioner of Patents